United States Patent
Friedersdorf et al.

(10) Patent No.: US 9,175,118 B2
(45) Date of Patent: Nov. 3, 2015

(54) PROCESSES AND APPARATUS FOR CONTINUOUS SOLUTION POLYMERIZATION

(71) Applicant: ExxonMobil Chemical Patents Inc., Baytown, TX (US)

(72) Inventors: Christopher B. Friedersdorf, Kingwood, TX (US); Trevan D. MacArthur, Houston, TX (US); Douglas A. Berti, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/378,561

(22) PCT Filed: Dec. 20, 2012

(86) PCT No.: PCT/US2012/070964
§ 371 (c)(1),
(2) Date: Aug. 13, 2014

(87) PCT Pub. No.: WO2013/137962
PCT Pub. Date: Sep. 19, 2013

(65) Prior Publication Data
US 2015/0073106 A1    Mar. 12, 2015

Related U.S. Application Data

(60) Provisional application No. 61/609,759, filed on Mar. 12, 2012.

(51) Int. Cl.
*C08F 210/06* (2006.01)
*C08F 2/06* (2006.01)
*C08J 11/02* (2006.01)
*B01D 5/00* (2006.01)

(52) U.S. Cl.
CPC ............ *C08F 210/06* (2013.01); *B01D 5/0003* (2013.01); *B01D 5/0051* (2013.01); *C08F 2/06* (2013.01); *C08J 11/02* (2013.01)

(58) Field of Classification Search
CPC .......... C08F 2/06; C08F 210/06; C08F 10/10; C08F 2/00; C08F 210/16; C08F 2500/01; C08F 2500/02; C08J 11/02; B01D 5/0051; B01D 5/0003
USPC ............. 524/525, 53, 528; 526/348; 422/109, 422/103, 129
See application file for complete search history.

(56) References Cited

U.S. PATENT DOCUMENTS

| | | | |
|---|---|---|---|
| 6,204,344 B1 | 3/2001 | Kendrick et al. | |
| 6,881,800 B2 | 4/2005 | Friedersdorf | |
| 7,163,989 B2 | 1/2007 | Friedersdorf | |
| 2009/0163642 A1* | 6/2009 | Kiss et al. ..................... | 524/525 |

FOREIGN PATENT DOCUMENTS

| | | |
|---|---|---|
| WO | 2008/082511 | 7/2008 |
| WO | 2008/109094 | 9/2008 |
| WO | 2009/126277 | 10/2009 |

* cited by examiner

*Primary Examiner* — William Cheung

(57) ABSTRACT

This invention relates to a blocked process for producing polymers of high and low molecular weights utilizing the same polymer separator. The separator is operated in a different mode depending on the molecular weight of the polymer being produced such that the separation system is operated in flash mode for the separation of low molecular weight polymers and operated in lower critical solution temperature (LCST) mode for the separation of high molecular weight polymers.

9 Claims, 2 Drawing Sheets

PROCESSES AND APPARATUS FOR CONTINUOUS SOLUTION POLYMERIZATION

PRIORITY CLAIM

This application is a National Stage Application of International Application No. PCT/US2012/070964, filed Dec. 20, 2012, which claims the benefit of and priority to U.S. Provisional Application Ser. No. 61/609,759 filed Mar. 12, 2012, the disclosures of which are fully incorporated herein by reference.

FIELD

This invention relates to continuous solution polymerization processes and an apparatus for performing the same.

BACKGROUND

A number of processes exist for producing polymers of varying molecular weight. One example of a polymerization process that can be used in the production of, inter alia, olefin based polymers (e.g., polyethylene and polypropylene) is continuous solution based polymerization.

Continuous polymerization processing can be economically advantageous over batch polymerization for high-volume polymer production. As opposed to batch polymerization, continuous processing requires smaller equipment (e.g., feed tanks and pumps) per unit of throughput, and therefore is less capital intensive with reduced power consumption and lower total running costs.

Continuous solution polymerization generally involves the addition of a catalyst to a monomer and optionally a solvent mixture. Examples of suitable catalysts for continuous solution polymerization processes include, but are not limited to, single site transition metal catalysts, such as metallocene catalysts. Upon reaction, the formed polymer is dissolved in the polymerization medium or solvent, often along with any catalyst and unreacted monomer, frequently with the solution exiting the reactor having a relatively low polymer concentration, such as from about 3 wt. % to 30 wt. %. The product mixture is then passed to polymer concentration and finishing stages to separate the solvent and unreacted monomer from the mixture such that the desired polymer can be recovered in a usable form. The separated solvent and monomer can then later be recycled back to the reactor for re-use.

It is well known that polymer solutions can undergo phase separation at the lower critical solution temperature (LCST), where both the polymer-rich phase and polymer-lean phase are either substantially liquids or supercritical fluids. This phase separation is encouraged by higher temperatures and/or lower pressures, but where the pressure is still high enough to prevent formation of a vapor phase. Accordingly, it is recognized to take advantage of this phenomenon of LCST phase separation to assist in separating the solvent and unreacted monomer from the polymer product of solution polymerization processes. The first step in this separation method involves heating the product mixture under high pressure, followed by reducing the pressure to a point where two phases (polymer-rich phase and polymer-lean phase) are formed. Of the two phases that are formed, the polymer-lean phase is rich in solvent and contains most of the unreacted monomer and contains very little polymer, whereas the rich phase is polymer rich. The denser polymer-rich phase settles to the bottom of the vessel where it is pressure fed to downstream equipment where the remaining solvent is removed. The solvent-rich phase (polymer-lean phase) overflows out the top of the separation vessel where it is cooled and recycled back to the reactor for re-use. With most polymers, the polymer-lean phase contains an extremely low polymer concentration, in an amount that does not interfere with the functioning of the solvent recycle stream.

Generally, LCST separation is the preferred method of polymer recovery for most conventional continuous solution polymerization processes, as it usually is the most energy efficient process. The benefits of the LCST separation is explained in more detail in U.S. Pat. Nos. 6,881,800 and 7,163,989 both of which are incorporated by reference. However, when producing low-molecular weight polymers, for example polymers having a significant fraction of their molecular weight distribution below 10,000 g/mol, LCST may be unable to provide a clean separation between the polymer product and the solvent. Because of this, a significant fraction of the polymer product is carried overhead in the lean phase, where it can plate out and detrimentally foul equipment in the recycle solvent stream. As a result, recovery of low molecular weight polymers is generally achieved by flash vaporization of the solvent. Flash vaporization prevents the low-molecular weight polymer from being carried over in the vapor stream into the recycle solvent stream which, in turn, prevents fouling. As an example, a description of a flash vaporization separation process can be found in U.S. Pat. No. 6,204,344.

Operating conditions for flash separation and LCST operation differ primarily in the pressure under which the separation is effected (higher pressures for LCST and lower pressures for flash vaporization), which also results in lower temperatures for flash vaporization due to the greater enthalpy of a vapor phase relative to a liquid or super critical fluid (SCF) polymer-lean phase. In practice this means that production of high and low molecular weight polymers may require the use of either different polymerization plants or different separation systems. The present invention seeks to provide a flexible process and production plant that can effectively accommodate the processing of both low molecular weight and high-molecular weight polymers in the same plant and using the same separation system.

SUMMARY

In one aspect, the invention resides in a blocked process for producing polymers of different molecular weights, the process comprising:
(A) for a first time period conducting a first polymerization to produce a first polymer by a process comprising:
  (i) effecting continuous polymerization of a first monomer in a first solvent to produce a first product effluent comprising the first solvent, the first polymer, and unreacted first monomer;
  (ii) heating the first product effluent;
  (iii) feeding the first product effluent under pressure to a first valve upstream of a separator;
  (iv) reducing the pressure of the first product effluent downstream of said first valve by an amount sufficient to separate the first product effluent into two phases in the separator said phases comprising a first polymer-rich phase and a first polymer-lean phase comprising said first solvent and unreacted first monomer wherein the polymer-rich phase is substantially in the liquid phase or supercritical phase and the polymer-lean phase is substantially in the liquid phase or supercritical phase;
  (v) recovering the first polymer from said first polymer-rich phase; and (vi) recycling unreacted first monomer and first solvent from the first polymer-lean phase to said polymerization A(i); and (B) for a second time period conducting a second polymerization to produce a second polymer having a lower molecular weight than the first polymer by a process comprising:

(i) effecting continuous polymerization of a second monomer in a second solvent to produce a second product effluent comprising the second solvent, the second polymer, and unreacted second monomer;

(ii) heating the second product effluent;

(iii) feeding the second product effluent under pressure to said separator;

(iv) reducing the pressure of the second product effluent in said separator by an amount sufficient to separate the second product effluent into a second polymer-rich liquid phase and a second polymer-lean vapor phase comprising said second solvent and unreacted second monomer;

(v) recovering the second polymer from said second polymer-rich liquid phase;

(vi) cooling the second polymer-lean vapor phase to condense said second solvent and said unreacted second monomer therefrom; and (vii) recycling the condensed second solvent and unreacted second monomer to said polymerization B(i).

In one embodiment, the first product effluent is heated by heat transfer from the first polymer-lean liquid phase in at least one primary heat exchanger and from an external source of heat in at least one secondary heat exchanger before being fed to the separator in (A) (ii) and the second product effluent is heated by heat transfer from the second polymer-lean vapor phase in said at least one primary heat exchanger before and from an external source of heat in at least one secondary heat exchanger being fed to the separator in (B) (ii). U.S. Pat. No. 6,881,800 describes this method in more detail, such patent being incorporated by reference.

In various embodiments, the first polymer has a weight average molecular weight greater than 100,000 g/mol, greater than 125,000 g/mol, and greater than 150,000 g/mol; and the second polymer has a weight average molecular weight less than 100,000 g/mol, less than 80,000 g/mol, and less than 50,000 g/mol.

In other embodiments, the first polymer has weight average molecular weights in range of from about 150,000 g/mol to about 10,000,000 g/mol, and the second polymer has a weight average molecular weight range of from about 5,000 g/mol to about 80,000 g/mol.

In a further aspect, the invention resides in apparatus for recovering polymers of different molecular weight produced sequentially by continuous solution polymerization in one or more polymerization reactors, the apparatus comprising:

a supply line for receiving a pressurized effluent of polymer, solvent, and unreacted monomer from the polymerization reactor(s);

one or more heat exchangers connected to the supply line for heating the pressurized effluent;

a separator for receiving the heated and pressurized effluent from the heat exchanger(s), the separator having a first outlet for a polymer-rich stream and a second outlet for a polymer-lean stream;

a pressure regulator operable to lower the pressure in the separator to at least (i) a first level at which the effluent in said separator separates into two phases comprising a polymer-rich phase and polymer-lean phase, or (ii) a second level lower than the first level at which the effluent in said separator separates into a polymer-rich liquid phase and polymer-lean vapor phase wherein the polymer-rich phase is substantially in the liquid phase or supercritical phase and the polymer-lean phase is substantially in the liquid phase or supercritical phase;

first valve means operable when the pressure in the separator is at said first level to supply a polymer-lean liquid phase from the separator through the one or more heat exchangers to the polymerization reactor(s);

a condenser;

second valve means operable when the pressure in the separator is at said second level to supply a polymer-lean vapor phase from the separator through the one or more heat exchangers to the condenser; and third valve means operable to supply condensed polymer-lean vapor phase from the condenser to the polymerization reactor.

DETAILED DESCRIPTION OF THE EMBODIMENTS

Figure 1:
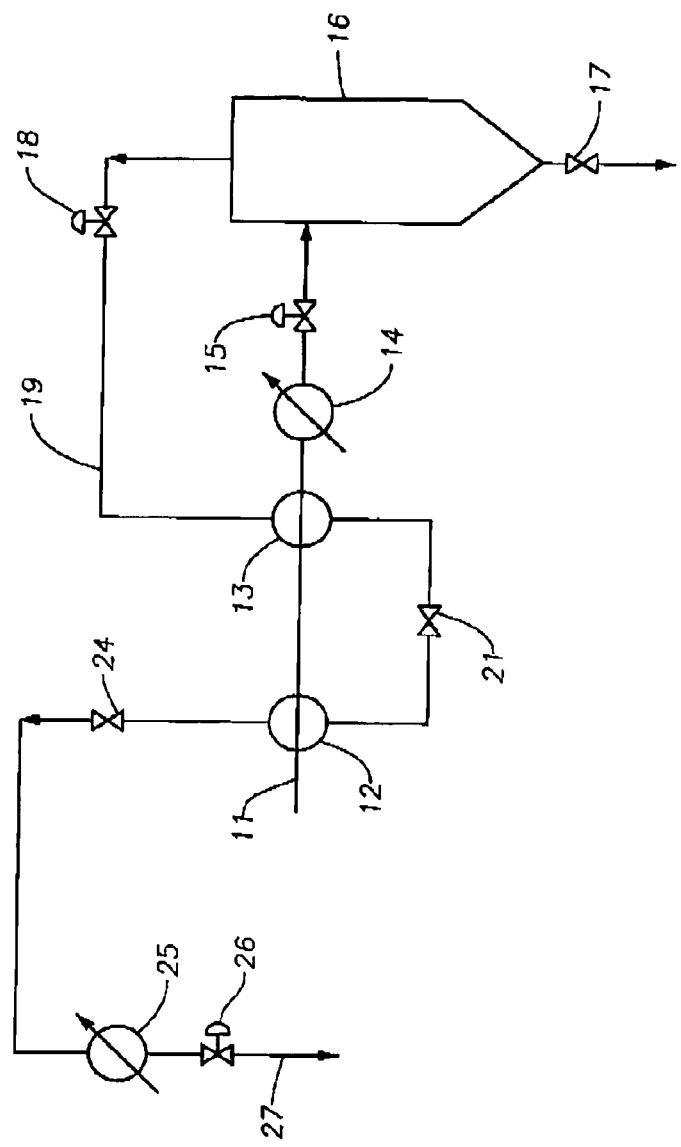
FIG. 1 is a schematic representation of the polymer recovery section of a continuous solution polymerization process according to one embodiment of the invention.

Described herein is a simplified blocked process and apparatus for the continuous solution polymerization of olefinic monomers that allows the production of low molecular weight and high-molecular weight polymers in the same plant and using the same separation system.

For purposes of this patent application, "blocked process" is defined as sequential production of different polymers in the same production plant for arbitrary blocks of time, in which only one product is produced in any given block of time.

In one embodiment, the term "high molecular weight polymer" is defined as a polymer having less than 20 wt. % of its molecular weight distribution below 10,000 g/mol such as less than 10 wt. %, less than 1 wt. %, and less than 0.1 wt. % of its molecular weight distribution below 10,000 g/mol. In contrast in this embodiment, the term "low molecular weight polymer" is used to refer to polymer having more than 20 wt. % of its molecular weight distribution below 10,000 g/mol such as more than 10 wt. %, more than 1 wt. %, and more than 0.1 wt. % of its molecular weight distribution below 10,000 g/mol.

In another embodiment, the term "low molecular weight polymer" is used herein to refer to a polymer having a weight average molecular weight less than 100,000 g/mol, less than 90,000 g/mol, and less than 75,000 g/mol, for example from about 1,000 g/mol to about 90,000 g/mol, such as from about 5,000 g/mol to about 75,000 g/mol, generally from about 10,000 g/mol to about 50,000 g/mol. In contrast in this embodiment, the term "high molecular weight polymer" is used herein to refer to a polymer having a molecular weight greater than 100,000 g/mol, greater than 125,000 g/mol, and greater than 150,000 g/mol, for example from about 110,000 g/mol to about 10,000,000 g/mol, such as from about 125,000 g/mol to about 5,000,000 g/mol, generally from about 150,000 g/mol to about 2,500,000 g/mol.

In a conventional metallocene-catalyzed, solution-based process for polymerizing olefinic monomers, such as ethylene, propylene, and/or other a-olefins, the product effluent exiting the polymerization reactor is a dilute solution of the desired polymer (typically 3 wt. % to 30 wt. %) in the polymerization solvent. The effluent solution may also contain significant quantities of unreacted monomer. In order to recover the polymer so that it can be made into useable form for sale, essentially all the solvent and unreacted monomer must be removed. In addition, to ensure sound process economics, as much as possible of the solvent and unreacted monomer must be recycled back to the polymerization reactor.

With high molecular weight polymers, recovery of the polymer initially involves heating the product effluent under high pressure to a temperature of 150° C. to 220° C. and then allowing the heated product to pass through a let-down valve into a high pressure separator. The rapid pressure drop across the let-down valve, typically a pressure let-down of greater than 20 bar/second, preferably 30 bar/second or more, even more preferably 40 bar/second or more causes the product effluent to pass through the lower critical solution temperature (LCST) boundary and separate into two phases: a polymer-rich phase and a polymer-lean phase comprising solvent and unreacted monomer wherein the polymer-rich phase is substantially in the liquid phase or supercritical phase and the polymer-lean phase is substantially in the liquid phase or supercritical phase. The denser polymer-rich phase settles to the bottom of the high-pressure separator, where it is pressure fed to downstream equipment and the rest of the solvent is removed. The polymer-lean phase overflows out the top of the separator where it is cooled and recycled back to the reactor for re-use of the solvent and the unreacted monomer. The polymer-lean contains extremely low concentrations of polymer that don't interfere with the functioning of the solvent recycle system.

In the case of low molecular weight polymers, effecting polymer recovery by the LCST process often fails to achieve a clean separation between the polymer and the solvent. As a result, a significant fraction of the polymer can be carried overhead in the polymer-lean phase where it may foul equipment in the recycle solvent system. Thus, with low-molecular weight polymers, it is normally necessary to remove the solvent by flash separation which, although less energy efficient than LCST, prevents any of the low-molecular weight polymer from solubilizing and being carried over in the vapor stream into the recycle solvent system.

The present process allows both low and high molecular weight solution polymers to be recovered in the same apparatus without the problem of carry-over of polymer in the solvent recycle stream. Thus, when the present process is used to produce high molecular weight polymers, the product effluent is fed at reaction pressure to one or more heat exchangers to raise the temperature of the effluent, if necessary. The heated effluent is then passed through a let-down valve into a separator whereby the pressure of the effluent is reduced by an amount sufficient to separate the first product effluent into two liquid/SCF phases comprising a polymer-rich phase and a polymer-lean phase. The polymer-rich phase settles to the bottom of the separator and is withdrawn for recovery of the polymer. The polymer-lean phase is withdrawn from the top of the separator and is cooled by heat exchange with the product effluent in said one or more heat exchangers before being recycled to the polymerization reactor. "Liquid/SCF phase" is defined herein as meaning the applicable phase may either be substantially in the liquid phase or the SCF phase. In the case of references of two or more phases, "liquid/SCF phases" is defined herein as meaning that each phase being referenced may be either substantially in the liquid phase or substantially in the SCF phase and wherein each phase may be the same or different.

When the present process is used to produce low molecular weight polymers, the product effluent is again fed at reaction pressure to said one or more heat exchangers to raise the temperature of the effluent without fouling the heat exchangers. The heated effluent is then passed through the let-down valve into the separator, but in this case the pressure of the effluent is reduced by a larger amount sufficient to separate the product effluent into a polymer-rich liquid phase and a polymer-lean vapor phase comprising said second solvent and unreacted second monomer. Again, the polymer-rich phase is withdrawn from the bottom of the separator for recovery of the polymer and the polymer-lean [vapor] phase is withdrawn from the top of the separator and is cooled in said one or more heat exchangers before being recycled to the polymerization reactor. It will therefore be appreciated that said one or more heat exchangers must be designed such that they can handle both vapor and liquid streams, such as TEMA X heat exchangers.

Referring to FIG. 1, in one embodiment of the invention, the outlet of a solution polymerization reactor (not shown) is connected by line 11 through first, second, and third series connected heat exchangers 12, 13, and 14, respectively to a first, let-down valve 15. In operation, the first and second heat exchangers 12 and 13 supply heat to the product effluent in line 11 from a polymer-lean recycle stream whereas the heat exchanger 14 supplies heat to the product effluent from an external source of heat, such as steam.

The let-down valve 15 controls the pressure and flow of the product effluent in line 11 into a separator 16, which is provided at its base with a second, polymer recovery valve 17 and at its top with a third, recycle control valve 18. The valve 18 is connected via line 19 to the second heat exchanger 13 which is connected to the first heat exchanger 12 by a fourth valve 21. The first heat exchanger 12 is connected by a sixth valve 24 to a further water cooled heat exchanger 25 which in turn is connected by a seventh valve 26 to the liquid recycle line 27 of the polymerization reactor (not shown).

For the case when a high molecular weight polymer is being produced, reactor effluent at high pressure in line 11 is partially heated by heat exchangers 12 and 13 using the hot polymer-lean phase in line 19 and then heated to its final target temperature in heat exchanger 14 using a heating medium such as steam. The pressure of the reactor effluent is then reduced across control valve 15 to the point where a polymer-lean phase and polymer-rich phase form in separator 16, wherein the polymer-rich phase is substantially in the liquid phase or supercritical phase and the polymer-lean phase is substantially in the liquid phase or supercritical phase. The denser polymer-rich phase is removed through valve 17, whereas the polymer-lean phase exits the top of the separator through line 19 (for LCST operation, the valve 18 is operated wide open such that it has no effect on the process). The polymer-lean phase then flows through the second heat exchanger 13 and, via valve 21, through the first heat exchanger 12 where it loses heat to the reactor effluent in line 11. The lean phase then flows through heat exchanger 25, in which it is cooled down to its final target temperature. Valve 15 is adjusted to control the pressure in the separator 16 such that the pressure is high enough to prevent vapor formation but low enough to allow the reactor effluent to condense into two phases.

For the case when a low molecular weight polymer is being produced, reactor effluent at high pressure is, as in LCST operation, partially heated by the hot effluent from the separator 16 in heat exchangers 12 and 13 and then heated to its final target temperature in heat exchanger 14 using a heating medium such as steam. The pressure of the reactor effluent is then reduced across valve 15 to the point where separate liquid and vapor phases form. The denser polymer-rich phase settles to the bottom of the separator 16 and is removed through valve 17. The hot polymer-lean vapor flows out the top of the separator 16 through valve 18, which regulates the pressure in the separator, and then through heat exchangers 12 and 13 where the vapor loses heat to the reactor product stream. The design of the heat exchange system is such that the hot polymer-lean vapor partially condenses in heat exchanger 13 and fully condenses in heat exchanger 12. The condensate is cooled down to the final target temperature in heat exchanger 25.

The invention will now be more particularly described with reference to FIG. 2 and the following simulated Example.

Figure 2:
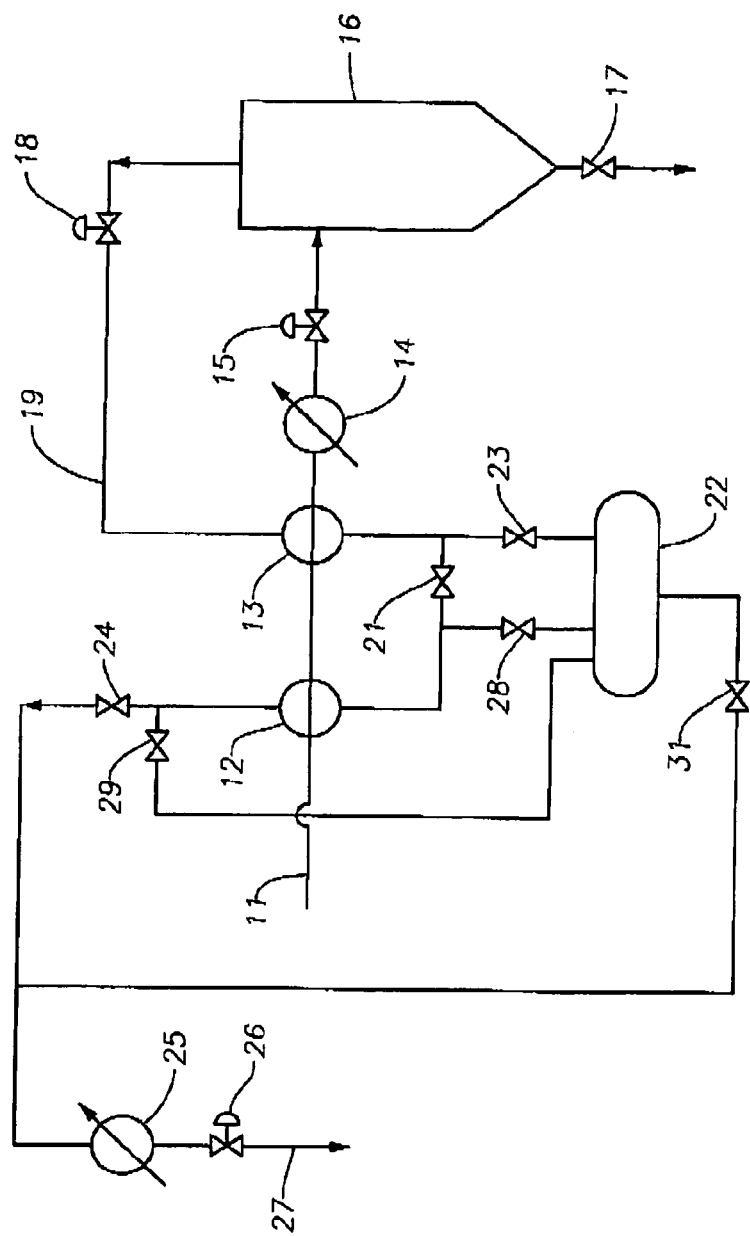
FIG. 2 is a schematic representation of the polymer recovery section of a continuous solution polymerization process according to an alternative embodiment of the invention.

Referring to FIG. 2, in one embodiment of the invention, the outlet of a solution polymerization reactor (not shown) is connected by line 11 through first, second, and third series connected heat exchangers 12, 13, and 14, respectively to a first, let-down valve 15. In operation, the first and second heat exchangers 12 and 13 supply heat to the product effluent in line 11 from a polymer-lean recycle stream whereas the heat exchanger 14 supplies heat to the product effluent from an external source of heat, such as steam.

The let-down valve 15 controls the pressure and flow of the product effluent in line 11 into a separator 16, which is provided at its base with a second, polymer recovery valve 17 and at its top with a third, recycle control valve 18. The valve 18 is connected via line 19 to the second heat exchanger 13 which is connected to the first heat exchanger 12 by a fourth valve 21 and which is connected to a condenser 22 via a fifth valve 23. The first heat exchanger 12 is connected by a sixth valve 24 to a further water cooled heat exchanger 25 which in turn is connected by a seventh valve 26 to the liquid recycle line 27 of the polymerization reactor (not shown).

The condenser 22 is connected by an eighth valve 28 to the first heat exchanger 12, by a ninth valve 29 to the sixth valve 24, and by a tenth valve 31 directly to the further water cooled heat exchanger 25.

For the case when a high molecular weight polymer is being produced, reactor effluent at high pressure in line 11 is partially heated by heat exchangers 12 and 13 using the hot polymer-lean phase in line 19 and then heated to its final target temperature in heat exchanger 14 using a heating medium such as steam. The pressure of the reactor effluent is then reduced across control valve 15 to the point where a polymer-rich phase and polymer-lean phase forms in separator 16, wherein the polymer-rich phase is substantially in the liquid phase or supercritical phase and the polymer-lean phase is substantially in the liquid phase or supercritical phase. The denser polymer-rich phase is removed through valve 17, whereas the polymer-lean phase exits the top of the separator through line 19 (for LCST operation, the valve 18 is operated wide open such that it has no effect on the process). The polymer-lean phase then flows through the second heat exchanger 13 and, via valve 21 (with valves 23 and 28 being closed), through the first heat exchanger 12 where it loses heat to the reactor effluent in line 11. The lean phase then flows through heat exchanger 25, in which it is cooled down to its final target temperature. Valve 15 is adjusted to control the pressure in the separator 16 such that the pressure is high enough to prevent vapor formation but low enough to allow the reactor effluent to condense into two phases wherein the two phases may be substantially in the liquid phase or substantially in the supercritical phase or both.

For the case when a low molecular weight polymer is being produced, reactor effluent at high pressure is, as in LCST operation, partially heated by the hot effluent from the separator 16 in heat exchangers 12 and 13 and then heated to its final target temperature in heat exchanger 14 using a heating medium such as steam. The pressure of the reactor effluent is then reduced across valve 15 to the point where separate liquid and vapor phases form. The denser polymer-rich phase settles to the bottom of the separator 16 and is removed through valve 17. The hot polymer-lean vapor flows out the top of the separator 16 through valve 18, which regulates the pressure in the separator, and then through heat exchangers 12 and 13 where the vapor loses heat to the reactor product stream. The design of the heat exchange system is such that the hot polymer-lean vapor partially condenses in heat exchanger 13, and the combined condensate/vapor stream flows into the condenser 22 (with valve 21 closed and valves 23 and 28 open). The uncondensed polymer-lean vapor flows from the overhead of the condenser 22 into the heat exchanger 12, where it condenses completely. By closing valve 24 and opening valve 29, the condensate in the heat exchanger 12 then returns to the condenser. Valve 31 is opened, and the condensate from condenser 22 flows through the heat exchanger 25, where it is cooled down to the final target temperature. Valve 31 acts as the level control valve for the condenser 22.

Example

Pro/II simulator and HTRI (heat exchanger design program) were used in parallel to both identify operating conditions and design heat exchangers that would allow for the operation of the apparatus of FIG. 2 in either LCST or flash mode. Laboratory reactor data on monomer conversion and reactor effluent composition was used as the basis for the simulations. The results for the solution polymerization of a propylene/ethylene mixture are shown in the following table.

|  | High-Molecular Weight Polymer/LCST Case | Low-Molecular Weight Polymer/Flash Case |
|---|---|---|
| Reactor Effluent |  |  |
| Temperature (C.) | 73.9 | 120 |
| Pressure (kPa) | 11851 | 11851 |
| Polymer Content (wt. %) | 11.1 | 10.1 |
| C2's Content (wt. %) | 1.0 | 0.1 |
| C3's Content (wt. %) | 22.1 | 13.3 |
| Solvent Content (wt. %) | 65.8 | 76.5 |
| Liquid Fraction | 1.00 | 1.00 |
| H/E 12 Outlet- tubeside |  |  |
| Temperature (C.) | 109.6 | 142 |
| Pressure (kPa) | 11631 | 11821 |
| Polymer Content (wt. %) | 11.1 | 10.1 |
| C2's Content (wt. %) | 1.0 | 0.1 |
| C3's Content (wt. %) | 22.1 | 13.3 |
| Solvent Content (wt. %) | 65.8 | 76.5 |
| Liquid Fraction | 1.00 | 1.00 |
| H/E 13 Outlet- tubeside |  |  |
| Temperature (C.) | 143.2 | 165.5 |
| Pressure (kPa) | 11411 | 11791 |
| Polymer Content (wt. %) | 11.1 | 10.1 |
| C2's Content (wt. %) | 1.0 | 0.1 |
| C3's Content (wt. %) | 22.1 | 13.3 |
| Solvent Content (wt. %) | 65.8 | 76.5 |
| Liquid Fraction | 1.00 | 1.00 |
| H/E 14 Outlet- tubeside |  |  |
| Temperature (C.) | 199.7 | 237 |
| Pressure (kPa) | 11191 | 11761 |
| Polymer Content (wt. %) | 11.1 | 10.1 |
| C2's Content (wt. %) | 1.0 | 0.1 |
| C3's Content (wt. %) | 22.1 | 13.3 |
| Solvent Content (wt. %) | 65.8 | 76.5 |
| Liquid Fraction | 1.00 | 1.00 |

| | High-Molecular Weight Polymer/LCST Case | Low-Molecular Weight Polymer/Flash Case |
|---|---|---|
| Separator 16 Bottoms | | |
| Temperature (C.) | 188.2 | 198.9 |
| Pressure (kPa) | 4501 | 3157 |
| Polymer Content (wt. %) | 33.8 | 51.7 |
| C2's Content (wt. %) | 0.6 | 0.0 |
| C3's Content (wt. %) | 15.8 | 3.2 |
| Solvent Content (wt. %) | 49.8 | 45.1 |
| Liquid Fraction | 1.00 | 1.00 |
| Separator 16 Overhead | | |
| Temperature (C.) | 188.2 | 198.9 |
| Pressure (kPa) | 4501 | 3157 |
| Polymer Content (wt. %) | 0.0 | 0.0 |
| C2's Content (wt. %) | 1.2 | 0.1 |
| C3's Content (wt. %) | 25.2 | 15.0 |
| Solvent Content (wt. %) | 73.6 | 84.9 |
| Liquid Fraction | 1.00 | 0 |
| H/E 13 Outlet- shellside | | |
| Temperature (C.) | 160.9 | 183.8 |
| Pressure (kPa) | 4391 | 3117 |
| Polymer Content (wt. %) | 0.0 | 0 |
| C2's Content (wt. %) | 1.2 | 0.1 |
| C3's Content (wt. %) | 25.2 | 15.5 |
| Solvent Content (wt. %) | 73.6 | 84.4 |
| Liquid Fraction | 1.00 | 0.76 |
| H/E 12 Outlet- shellside | | |
| Temperature (C.) | 121.2 | 139.5 |
| Pressure (kPa) | 4281 | 3097 |
| Polymer Content (wt. %) | 0.0 | 0.0 |
| C2's Content (wt. %) | 1.2 | 0.1 |
| C3's Content (wt. %) | 25.2 | 24.6 |
| Solvent Content (wt. %) | 73.6 | 75.3 |
| Liquid Fraction | 1.00 | 1.00 |
| Condenser 22 Bottoms | | |
| Temperature (C.) | N/A | 173.4 |
| Pressure (kPa) | N/A | 3097 |
| Polymer Content (wt. %) | N/A | 0.0 |
| C2's Content (wt. %) | N/A | 0.1 |
| C3's Content (wt. %) | N/A | 15.5 |
| Solvent Content (wt. %) | N/A | 84.4 |
| Liquid Fraction | N/A | 1.00 |
| H/E 25 Outlet | | |
| Temperature (C.) | 45 | 41.9 |
| Pressure (kPa) | 4171 | 3067 |
| Polymer Content (wt. %) | 0.0 | 0.0 |
| C2's Content (wt. %) | 1.2 | 0.1 |
| C3's Content (wt. %) | 25.2 | 15.5 |
| Solvent Content (wt. %) | 73.6 | 84.4 |
| Liquid Fraction | 1.00 | 1.00 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing polymers of different molecular weights, the process comprising:
   (A) for a first time period conducting a first polymerization to produce a first polymer by a process comprising:
      (i) effecting continuous polymerization of a first monomer in a first solvent to produce a first product effluent comprising the first solvent, the first polymer, and unreacted first monomer;
      (ii) heating the first product effluent;
      (iii) feeding the first product effluent under pressure to a first valve upstream of a separator;
      (iv) reducing the pressure of the first product effluent downstream of said first valve by an amount sufficient to separate the first product effluent into two phases in the separator said phases comprising a first polymer-rich phase and a first polymer-lean phase comprising said first solvent and unreacted first monomer wherein the polymer-rich phase is substantially in the liquid phase or supercritical phase and the polymer-lean phase is substantially in the liquid phase or supercritical phase;
      (v) recovering the first polymer from said first polymer-rich phase; and
      (vi) recycling unreacted first monomer and first solvent from the first polymer-lean phase to said polymerization A(i); and
   (B) for a second time period conducting a second polymerization to produce a second polymer having a lower molecular weight than the first polymer by a process comprising:
      (i) effecting continuous polymerization of a second monomer in a second solvent to produce a second product effluent comprising the second solvent, the second polymer, and unreacted second monomer;
      (ii) heating the second product effluent;
      (iii) feeding the second product effluent under pressure to said separator;
      (iv) reducing the pressure of the second product effluent in said separator by an amount sufficient to separate the second product effluent into a second polymer-rich liquid phase and a second polymer-lean vapor phase comprising said second solvent and unreacted second monomer;
      (v) recovering the second polymer from said second polymer-rich liquid phase;
      (vi) cooling the second polymer-lean vapor phase to condense said second solvent and said unreacted second monomer therefrom; and
      (vii) recycling the condensed second solvent and unreacted second monomer to said polymerization B(i);
   wherein the second polymer is a low molecular weight polymer wherein the low molecular weight polymer is a polymer having more than 10 wt. % of its molecular weight distribution below 10,000 g/mol.

2. The process of claim 1, wherein the heating step of the first product effluent in A(ii) is provided by at least two heating stages wherein the first heating stage comprises heat transfer from the first polymer-lean phase in at least one primary heat exchanger and the second heating stage comprises heat transfer from an external source of heat in at least one secondary heat exchanger before being fed to the separator in (A)(iii).

3. The process of claim 1, wherein the heating step of the second product effluent in B(ii) is provided by at least two heating stages wherein the first heating stage comprises heat transfer from the second polymer-lean vapor phase in at least one primary heat exchanger and the second heating stage comprises heat transfer from an external source of heat in at least one secondary heat exchanger before being fed to the separator in (B)(iii).

4. The process of claim 1, wherein the first polymer is a high molecular weight polymer wherein the high molecular weight polymer is a polymer having less than 20 wt. % of its molecular weight distribution below 10,000 g/mol.

5. The process of claim 1, wherein the first polymer has a molecular weight greater than 125,000 g/mol and the second polymer has a molecular weight less than 90,000 g/mol.

6. An apparatus for recovering a first and a second polymer of different molecular weights produced sequentially by continuous solution polymerization in one or more polymerization reactors, the apparatus comprising:
- a supply line for receiving a pressurized effluent of polymer, solvent, and unreacted monomer from the polymerization reactor(s);
- one or more heat exchangers connected to the supply line for heating the pressurized effluent;
- a separator for receiving the heated and pressurized effluent from the heat exchanger(s), the separator having a first outlet for a polymer-rich stream and a second outlet for a polymer-lean stream;
- a pressure regulator operable to lower the pressure in the separator to at least (i) a first level at which the effluent in said separator separates into two liquid/SCF phases comprising a polymer-rich phase and polymer-lean phase, and (ii) a second level lower than the first level at which the effluent in said separator separates into a polymer-rich liquid phase and polymer-lean vapor phase;
- first valve means operable when the pressure in the separator is at said first level to supply a polymer-lean phase from the separator through the one or more heat exchangers to the polymerization reactor(s);
- a condenser;
- second valve means operable when the pressure in the separator is at said second level to supply a polymer-lean vapor phase from the separator through the one or more heat exchangers to the condenser; and
- third valve means operable to supply condensed polymer-lean vapor phase from the condenser to the polymerization reactor.

7. The apparatus of claim 6, wherein the first polymer is a high molecular weight polymer wherein the high molecular weight polymer is a polymer having less than 20 wt. % of its molecular weight distribution below 10,000 g/mol.

8. The apparatus of claim 6, wherein the second polymer is a low molecular weight polymer wherein the low molecular weight polymer is a polymer having more than 10 wt. % of its molecular weight distribution below 10,000 g/mol.

9. The apparatus of claim 6, wherein the first polymer has a molecular weight greater than 125,000 g/mol and the second polymer has a molecular weight less than 90,000 g/mol.

* * * * *